Figure 1:
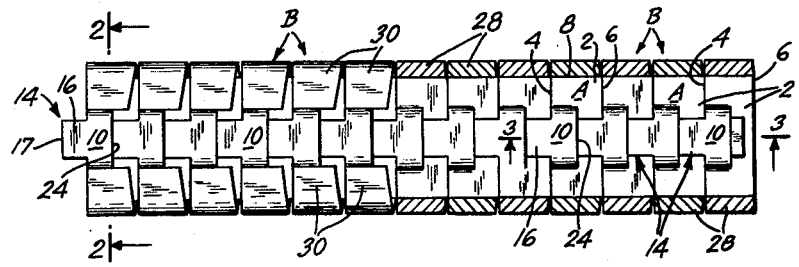

May 18, 1965

E. RODRIGUEZ 3,183,660

LINKAGE OF LIMITED FLEXIBILITY

Filed March 7, 1962

INVENTOR.
EMIL RODRIGUEZ
BY James and Franklin
ATTORNEYS

United States Patent Office 3,183,660
Patented May 18, 1965

3,183,660
LINKAGE OF LIMITED FLEXIBILITY
Emil Rodriguez, New York, N.Y., assignor to Jacoby-Bender, Inc., Woodside, N.Y., a corporation of New York
Filed Mar. 7, 1962, Ser. No. 178,063
16 Claims. (Cl. 59—82)

The present invention relates to a link chain of simplified construction which has a limited degree of relative movement between the interconnected links but which is readily flexible within that limited degree. It is specially adapted for, but not necessarily limited to, use in a bracelet.

There are many applications where it is desired that a link chain be readily flexible, but only within predetermined limits. For example, a wrist-encircling bracelet, useable as such or to retain a wrist watch or other device in place, must be sufficiently flexible in a longitudinal sense to conform freely to the contour of the wrist of the individual wearing that bracelet. However, excessive flexibility in a device of this type is undesirable for several reasons. If the bracelet is not reasonably self-sustaining as a longitudinally extended assembly it will tend to be flaccid, and therefore will produce an unsightly appearance. It should be substantially inflexible laterally in order to retain a uniform position on the wrist of the wearer and, when it is used to hold a wrist watch in place, to retain the wrist watch in desired location. When the bracelet is flexed longitudinally it should nevertheless give the appearance of a continuous chain with no readily visible gaps therein.

A further important requirement of a chain linkage of the type under discussion is that it be readily and inexpensively manufactured on a mass production basis, that it produce a linkage which is sturdy and reliable, and that the addition of ornamental members to that linkage be readily accomplished. Here again excessive flexibility, or flexibility over too great a range of movement, is disadvantageous.

It is sometimes desired that the linkage be tapered, and in such instances it is extremely advantageous if the linkage can initially be manufactured from a plurality of identical elements which are connected together in desired fashion to form an elongated chain, the desired tapered configuration thereafter being imparted to that chain without impairment of the articulate connection between the individual links.

The structure of the present invention is specifically designed to the accomplishment of all of the above mentioned characteristics and objectives. More particularly, the linkage of the present invention is formed from a plurality of substantially identical links, each preferably of one-piece construction, which may readily be shaped from sheet metal in large quantities through conventional production techniques. The shape imparted to each link is such that when the links are joined together, that joining being accomplished in an extremely simple manner, the desired degree of articulate freedom is inherently produced. More specifically, each link is provided with a tongue extending forwardly from a depressed portion thereof, that tongue passing through a slot in the next adjacent link and being reversely bent over the upper surface of that next adjacent link. When the links are thus assembled the tips of the tongues of each link may be closely adjacent to portions of the tongues of the next preceding links. The spacing between these several parts permits an articulate movement of the links, but only to a limited degree determined by that spacing. Ornamental elements such as shells may readily be attached to each link without adversely interfering with the articulation of the chain. The various elements of the chain are closely positioned relative to one another, thereby imparting to the chain a smooth and continuous appearance even when the chain is flexed.

Figure 2:
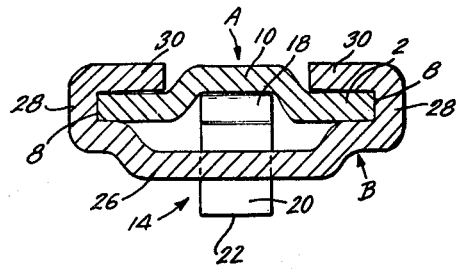
Figure 3:
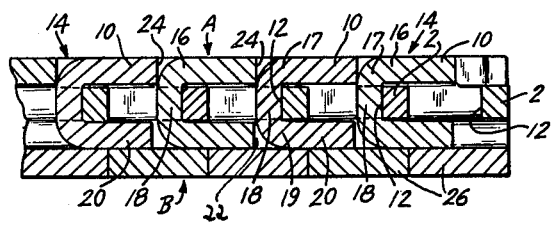
Figure 4:
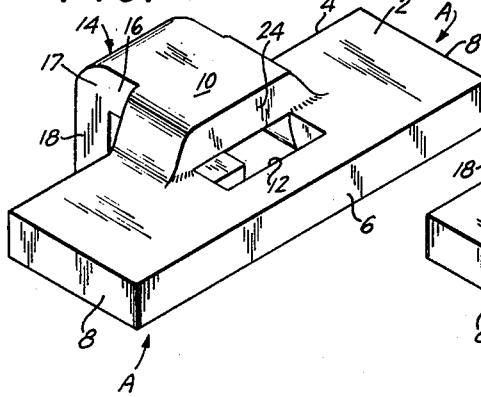
Figure 5:
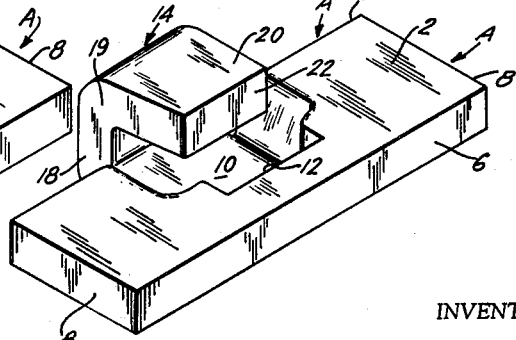

To the accomplishment of the above, and to such other objects as may hereinafter appear, the present invention relates to the construction of a linkage of limited flexibility, as defined in the appended claims and as described in this specification, taken together with the accompanying drawings, in which:

FIG. 1 is a bottom plan view, partially cross sectioned, of a preferred embodiment of the present invention;

FIGS. 2 and 3 are cross sectional views taken respectively along the lines 2—2 and 3—3 of FIG. 1;

FIG. 4 is a three-quarter perspective view of an individual link, the normally lower surface thereof being uppermost, the link being shown with its tongue bent down to connecting position; and FIG. 5 is a view similar to FIG. 4 but with the normally upper surface thereof uppermost.

The linkage comprises a plurality of preferably identical main links generally designated A to which ornamental shells generally designated B are adapted to be attached. Each main link A is adapted to be formed from a single piece of structural material such as sheet metal and comprises a base 2 having front edge 4, rear edge 6 and side edges 8. A portion 10 of the base 2 which extends rearwardly from the front base edge 4 an terminates short of the rear base edge 6 is depressed below the body of the base 2, a slot 12 being formed in the base 2 immediately rearwardly of the depressed portion 10. A tongue generally designated 14 extends out forwardly from the depressed base portion 10, the width of the tongue 14 being somewhat smaller than the width of the slot 12. The tongue 14 comprises a first part 16 extending forwardly from and substantially co-planar with the depressed base portion 10, a part 18 adapted to be bent up vertically substantially at right angles to the part 16 and spaced forwardly from the front base edge 4, and a tip part 20 which, in the initial unassembled condition of the link A, constitutes a prolongation of the vertical part 18 (see FIG. 2). The spacing between the second tongue part 18 and the front base edge 4 corresponds to the spacing between the slot 12 and the rear base edge 6. The depressed body portion 10, tongue 14 and slot 12 are all substantially in line with one another, and are preferably positioned midway between the base side edges 8.

When the links A are to be assembled to one another the tongue parts 18 and 20 of a given link A are passed through the slot 12 in the next adjacent link A, the tip part 20 of the tongue 14 of said given link A then extending up above the upper surface of the base 2 of said next adjacent link A. The tongue part 16 engages the lower surface of the base 2 of the next adjacent link, thus ensuring that the bases 2 of the interconnected links be substantially in the same horizontal plane. The two links A are then secured together by bending the tip part 20 of the tongue 14 of said given link A down over the upper surface of said next adjacent link A. The length of the tip part 20 of the tongue 14 of the given A is such that when it is thus bent down its end 22 is positioned short of the slot 12 of the link A of which it is a part. As will clearly be seen from FIG. 3, the bent portion 17 of the tongue 14 which joins the parts 16 and 18 thereof is slightly spaced from and almost abuts against the exposed end surface 24 of the depressed portion 10 of the link A through whose slot 12 it passes.

This linking procedure is continued, links A being added until a linkage of desired length is formed. In practice any desired number of links A may be connected together with all of the tongue tip parts 20 extending upwardly, all of those tongue tip parts 20 thereafter being bent down over the upper surface of the link bases 2 in a single manipulative operation. The ends 22 of the tongue tip parts 20 may (see FIG. 3) be relatively close to the bend 19 connecting the tongue parts 18 and 20 of an adjacent link A.

With the linkage as thus constituted, it will be seen that all of the links A are closely poistioned relative to one another, that they are maintained substantially in a coplanar relationship, that the flexibility of the links laterally is minimized by the width of the tongue parts 18 and their relatively close fit within the slots 12 through which they pass, and that flexing of the bracelet longitudinally in a downward sense (upwardly as shown in FIG. 3) is freely permitted only over a limited degree of relative movement of adjacent links A, only in part determined by the tightness with which the tongues 14 grasp portions of the bases 2 of adjacent links. Flexing forces tend to wedge the tongue parts away from one another, so that this type of flexure control is quite unreliable. The instant linkage provides a much more effective and positive means of limiting flexure, relative link movement being permitted until the surfaces 24 on the depressed base portions 10 of each link abut against the bends 17 connecting the tongue parts 16 and 18 on an adjacent link. Further flexing of the bracelet in that direction is firmly resisted by the abutment against one another of masses of solid sturdy material, thus making the flexure stop highly positive in nature and rendering the links extremely resistant to damage or dislocation in the event that excessive flexing forces be applied thereto. It is preferred that this positive stopping of flexure occur before any appreciable tongue-opening wedging force is extended on the tongue 14, thus increasing the reliability of connection between the links A.

The linkage as thus far described has an appearance which may in some instances be excessively functional or not be sufficiently ornamental for decorative use. Accordingly, each base 2 of a link A is adapted to have secured thereto an ornamental shell B, that shell comprising a top wall 26 the exposed upper surface of which is ornamented in any desired manner, side walls 28 and securing tabs 30 depending from ends of said top wall 26. The securing tabs 30 are adapted to be bent around the side edges 8 of the base 2 of a link A in order thereby to clamp the shell B in position (as may best be seen from FIG. 2), those tabs 30 preferably having a thickness no greater than, and generally substantially the same as, the degree to which the base portion 10 is depressed below the body 2 of that base, so that the undersurface of the linkage, shown in FIG. 1, has no sharp protruding edges which might scratch, injure or irritate the wrist of the wearer of a bracelet formed from the linkage in question.

When the ornamental shells B are in position and the linkage is longitudinally linear, the top walls 26 of the shells B will normally abut against one another (see FIG. 3), thus limiting flexibility of the linkage in an upward direction (downward as viewed in FIG. 3) and imparting to the chain an appearance of continuity and solidity. Accordingly, in a finished product consisting of links A and shells B the precise spacing between the ends 22 of the tongue tips 20 on a given link A and the bends 19 connecting the tongue parts 18 and 20 on the next adjacent link is not particularly crtical. However, it is preferred that said spacing be minimized in order that the flexibility of the linkage composed exclusively of the links A, before the ornamental shells B are applied thereto, be limited in the upward direction as well as in the downward direction. This facilitates manipulation of the assembly of links A during processing.

Where a linkage with tapered or otherwise configured side edges is desired, a preliminary assembly of identical links A is first produced. Thereafter the side portions of the base 2 are cut or otherwise shaped to desired form. This operation will not affect the articulate connection between the links A nor the degree to which that articulation is inherently limited by the connecting structure employed. Thereafter ornamental shells B of appropriate size and shape may be attached to the individual links A.

From the above it will be apparent that a sturdy and reliable linkage has been produced from a plurality of sets of substantially identical parts, all of the parts being readily manufactured and assembled on a mass production basis. The thus-produced linkage is flexible in the direction and to the extent that such flexibility is desired, undesired flexing being positively prevented by means of structure of exceptional strength. Moreover, the linkage produced is attractive whether straight or flexed.

While but a single embodiment of the present invention has been here specifically disclosed, it will be apparent that many variations may be made therein, all within the scope of the instant invention as defined in the following claims.

I claim:

1. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located immediately adjacent the rear part of said depressed portion, the tongue of a given link being interlocked with the next succeeding link by being bent up through the slot in said next succeeding link and reversely bent over the upper surface of said next succeeding link.

2. In combination with the linkage of claim 1, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

3. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located immediately adjacent the rear part of said depressed portion, the tongue of a given link being interlocked with the next succeeding link by being bent up through the slot in said next succeeding link and reversely bent over the upper surface of said next succeeding link and extending to a point closely adjacent the tongue of the next preceding link as that latter tongue passes through the slot in said given link.

4. In combination with the linkage of claim 3, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

5. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located immediately adjacent the rear part of said depressed portion, the tongue of a given link being interlocked with the next succeeding link by being bent up through the slot in said next succeeding link and reversely bent over the upper surface of said next succeeding link, the tongue of said given link, as it passes through the slot in the next succeeding link, being closely adjacent the depressed portion of the base of said next succeeding link.

6. In combination with the linkage of claim 5, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

7. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located immediately adjacent the rear part of said depressed portion, the tongue of a given link being interlocked with the next succeeding link and reversely bent over the upper surface of said next succeeding link and extending to a point closely adjacent the tongue of the next preceding link as that latter tongue passes through the slot in said given link, the tongue of said given link, as it passes through the slot in the next succeeding link, being closely adjacent the depressed portion of the base of said next succeeding link.

8. In combination with the linkage of claim 7, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

9. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located at the rear part of said depressed portion, the tongue of a given link being interlocked with the next succeeding link by being bent up through the slot in said next succeeding link and reversely bent over the upper surface of said next succeeding link.

10. In combination with the linkage of claim 9, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

11. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located at the rear part of said depressed portion, the tongue of a given link being interlocked with the next succeeding link by being bent up through the slot in said next succeeding link and reversely bent over the upper surface of said next succeeding link and extending to a point closely adjacent the tongue of the next preceding link as that latter tongue passes through the slot in said given link.

12. In combination with the linkage of claim 11, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

13. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located at the rear part of said depressed portion, the tongue of a given link being interlocked with the next succeeding link by being bent up through the slot in said next succeeding link and reversely bent over the upper surface of said next succeeding link, the tongue of said given link, as it passes through the slot in the next succeeding link, being closely adjacent the depressed portion of the base of said next succeeding link.

14. In combination with the linkage of claim 13, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

15. A linkage of limited flexibility comprising a plurality of links, each link comprising a base with front, rear and side edges, said links being arranged substantially in the same plane with the front edge of each link facing the rear edge of the next succeeding link, a portion of the base of each link which extends rearwardly from the front edge of the link base and terminates short of the rear edge of the link base being depressed below and outwardly from the body of said base, a tongue extending forwardly from said depressed portion, said base having a slot of a size that said tongue can pass therethrough, said slot being located at the rear part of said depressed portion, the tongue of a given link being interlocked with the next succeeding link by being bent up through the slot in said next succeeding link and reversely bent over the upper surface of said next succeeding link and extending to a point closely adjacent the tongue of the next preceding link as that latter tongue passes through the slot in said given link, the tongue of said given link, as it passes through the slot in the next succeeding link, being closely adjacent the depressed portion of the base of said next succeeding link.

16. In combination with the linkage of claim 15, an ornamental shell covering the upper surface of the base of a given link and secured thereto by tabs bent around the side edges of said base, extending along the lower surface thereof and terminating short of said depressed base portion, the thickness of said tabs being no greater than the distance said base portion is depressed below said body of said base.

References Cited by the Examiner
UNITED STATES PATENTS

| | | | |
|---|---|---|---|
| 1,153,362 | 9/15 | Wacha | 59—80 |
| 1,405,851 | 2/22 | Lewis | 59—80 |
| 1,598,250 | 8/26 | Person | 59—80 |
| 1,701,941 | 2/29 | Allsopp | 59—91 |
| 2,400,591 | 5/46 | Nanasi | 59—80 |

CHARLES W. LANHAM, *Primary Examiner.*
MICHAEL V. BRINDISI, *Examiner.*